United States Patent [19]

Fukuda et al.

[11] Patent Number: 5,748,926
[45] Date of Patent: May 5, 1998

US005748926A

[54] DATA PROCESSING METHOD AND APPARATUS

[75] Inventors: Ryoji Fukuda, Kawasaki; Takashi Harada, Yamato, both of Japan

[73] Assignee: Canon Kabushiki Kaisha, Tokyo, Japan

[21] Appl. No.: 634,426

[22] Filed: Apr. 18, 1996

[30] Foreign Application Priority Data

Apr. 18, 1995 [JP] Japan ................................. 7-116416

[51] Int. Cl.$^6$ .................. G06F 15/00; G09G 5/00
[52] U.S. Cl. ................... 395/326; 395/358; 345/173; 345/179; 382/187
[58] Field of Search ........................ 395/326, 340, 395/347, 352, 353, 358; 345/179, 173; 382/159, 160, 186, 187, 202, 209

[56] References Cited

U.S. PATENT DOCUMENTS 5,414,228  5/1995  Yamashita ............................. 178/18

FOREIGN PATENT DOCUMENTS 0562767   3/1993   European Pat. Off. .
2536608   11/1982  France .
619615    1/1994   Japan .

OTHER PUBLICATIONS

Carr, Robert Jr., "The Point of the Pen", Byte, vol. 16, No. 2, Feb. 1, 1991, pp. 211–214, 216, 219–221.

Millen, David R., "Pen–Based User Interfaces", AT&T Technical Journal, vol. 72, No. 3, May/Jun. 1993, pp. 21–27.

Manke, Stefan and Ulrich Bodenhausen, "A Connectionist Recognizer For On–line Cursive Handwriting Recognition", Institute of Electrical and Electronics Engineers, vol. 2, Apr. 19, 1994, pp. II–633—II–636.

*Primary Examiner*—Mark R. Powell
*Assistant Examiner*—Huynh Ba
*Attorney, Agent, or Firm*—Fitzpatrick, Cella, Harper & Scinto

[57] ABSTRACT

A data processing method and apparatus, in which gestures and other characters or figures are discriminatively recognized even in an area for handwritten characters, in which effective gestures are defined in any input areas, and in which various gestures are recognized by using a simple method and means to enable reducing a load to the apparatus. The method and apparatus can be realized by using a small size device. Further, in the method and apparatus, kinds of commands to be selected by using a stylus are recognized in accordance with touches, moves, and halts of the stylus, or successive rules related to the states of the stylus.

8 Claims, 6 Drawing Sheets

FIG. 3

| GESTURE | OPERATION NAMES (ABBREVIATIONS) | | d | (1) $P_1$ m $P_2$ | (2) $P_1$ m $P_2$ | ... |
|---|---|---|---|---|---|---|
| \/ | TAP | (T) | 1 | 0 0 0 | | |
| \/ | PRESS | (P) | 1 | 1 0 0 | | |
| \_/ | DRAG | (D) | 1 | 0 1 0 | | |
| \_/ | PRESS-DRAG | (PD) | 1 | 1 1 0 | | |
| \_/ | DRAG-PRESS | (DP) | 1 | 0 1 1 | | |
| \_/ | PRESS-DRAG-PRESS | (PDP) | 1 | 1 1 1 | | |
| \/\/ | DOUBLE TAP | (WT) | 2 | 0 0 0 | 0 0 0 | |
| \/\/ | TAP-PRESS | (TP) | 2 | 0 0 0 | 1 0 0 | |
| \/\_/ | TAP-DRAG | (TD) | 2 | 0 0 0 | 0 1 0 | |
| \/\_/ | TAP-PRESS-DRAG | (TPD) | 2 | 0 0 0 | 1 1 0 | |
| \/\_/ | TAP-DRAG-PRESS | (TDP) | 2 | 0 0 0 | 0 1 1 | |
| \/\_/ | TAP-PRESS-DRAG-PRESS | (TPDP) | 2 | 0 0 0 | 1 1 1 | |
| \/\/ | PRESS-TAP | (PT) | 2 | 1 0 0 | 0 0 0 | |
| \/\/ | DOUBLE PRESS | (WP) | 2 | 1 0 0 | 1 0 0 | |
| ⋮ | ⋮ | | ⋮ | ⋮ | ⋮ | |

FIG. 4

| GESTURE | OPERATION NAMES | OPERATION |
|---|---|---|
| ∨ | PRESS | SELECT A WINDOW |
| ∫ | PRESS-DRAG | MOVE A WINDOW |
| ∫• | PRESS-DRAG-PRESS | DISPLAY A WINDOW AS AN ICON |
| ∨∨ | PRESS-TAP | COPY A WINDOW |
| ∨∨• | DOUBLE PRESS | ERASE A WINDOW |
| ∨∫ | PRESS-UP-DRAG | RESIZE A WINDOW |

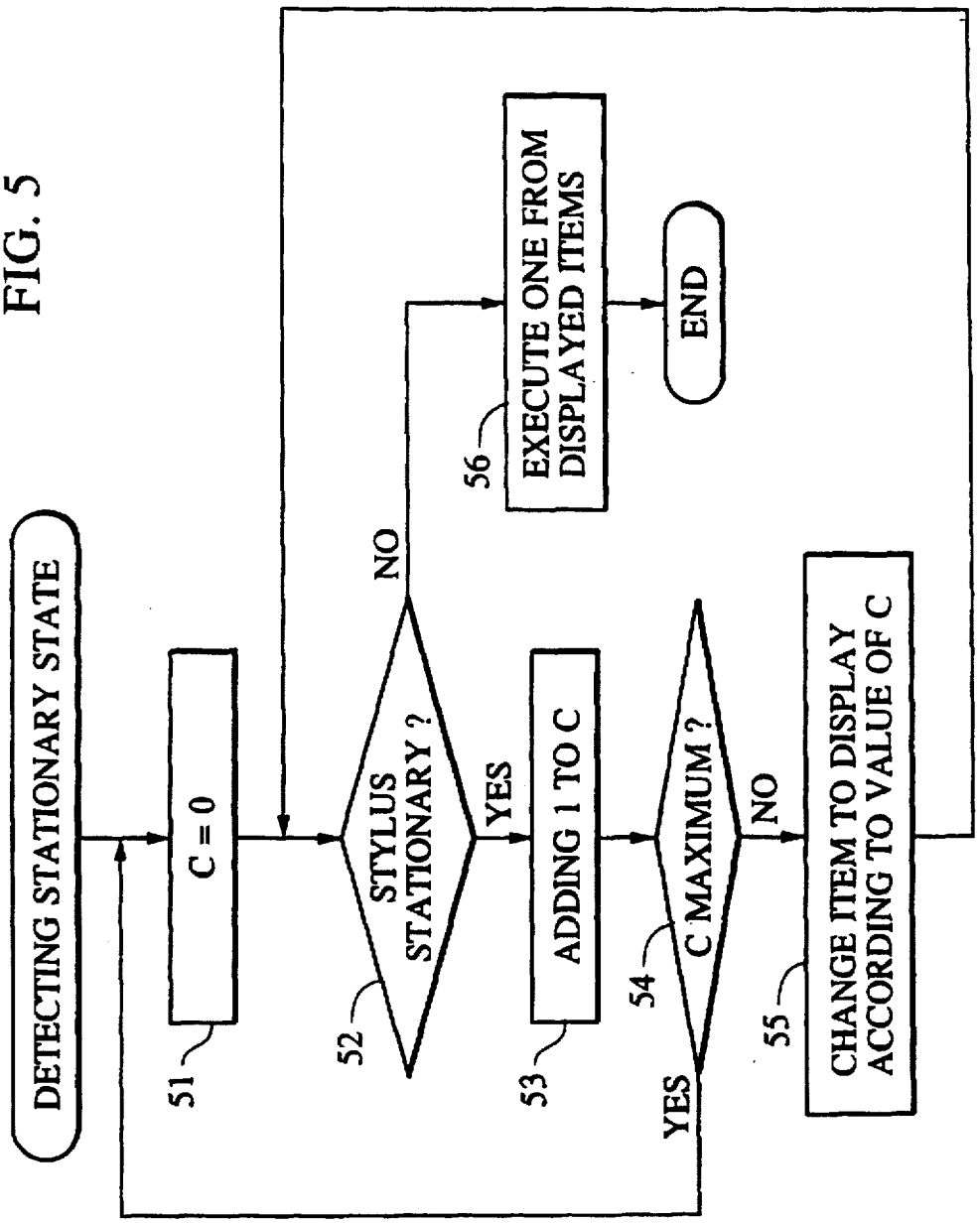

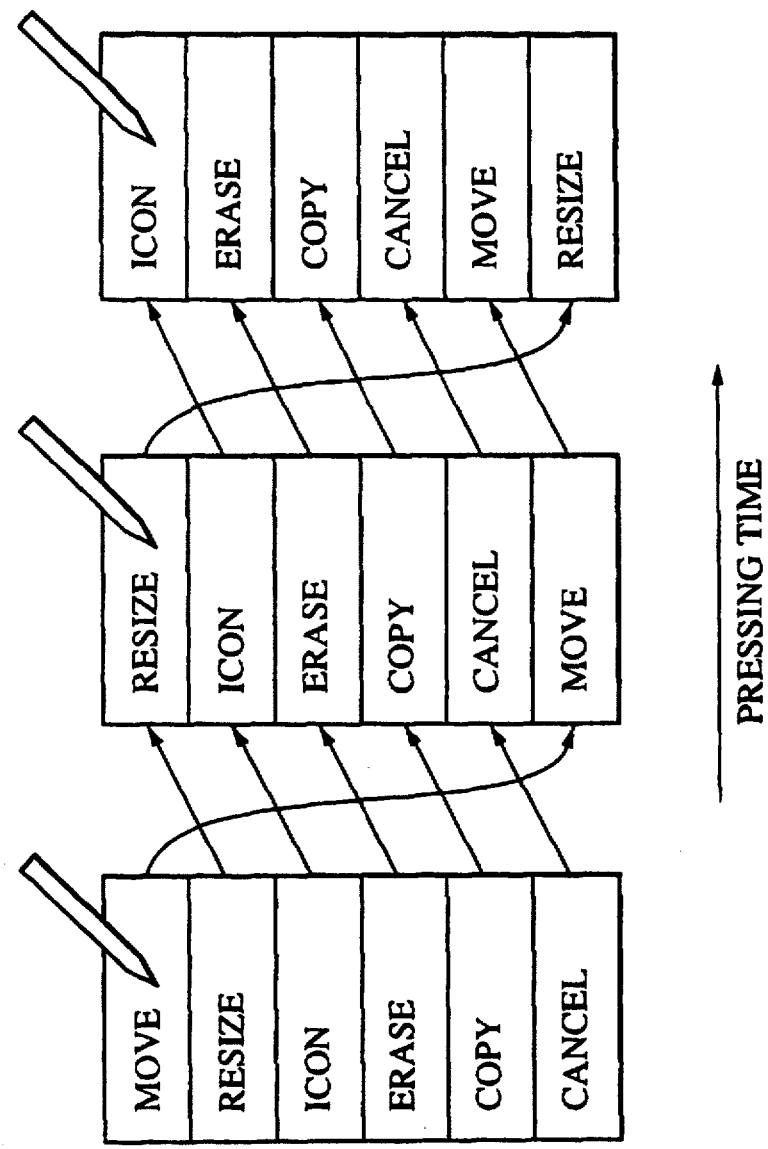

DATA PROCESSING METHOD AND APPARATUS

BACKGROUND OF THE INVENTION

1. Field of the Invention

This invention relates to a data processing method and apparatus to enable input by using a handwriting instrument such as a stylus, and/or to enable input of commands.

2. Description of the Related Art

In data processing apparatuses enabling input with a stylus, there has been known an example using a system of commands called gestures, into which proof-correction marks used in printing are introduced. Software using the gestures, such as "Windows for Pen Computing" as a registered trademark, created by Microsoft Corporation in the U.S.A., is designed such that operation like editing a text is enabled by using gestures which are recognized mainly depending on inputted patterns of loci drawn with a stylus, while operation like moving or enlarging a window is enabled by bringing the stylus into contact with a frame surrounding the window, or a button provided on a title bar, or the like.

However, the above conventional example utilizes the gestures which are recognized based on patterns of loci, consequently the example has problems that a gesture cannot be recognized in an input area for handwritten characters and an area for free handwriting, and that characters or figures resembling marks of the gestures cannot be inputted in the area for handwritten characters and the area for free handwriting.

To overcome such problems, the countermeasure has conventionally been taken such that gestures effective in the whole window system are nullified and specific gestures are defined for the respective areas. However, the countermeasure has a problem that gestures effective in the whole window system cannot be defined.

On the other hand, there is a conventional example whereby specifies a character, a word or a sentence to be processed by inputting a command, by tapping input means like a stylus. Tapping a stylus however simply has a function of designating a position, so that the tapping has not been used for a purpose of functioning as a command.

SUMMARY OF THE INVENTION

1. Object of the Invention

It is an object of the present invention to provide a data processing method and apparatus capable of discriminatively recognizing patterns of gestures and other characters or figures, and defining gestures effective in any input areas.

It is another object of the present invention to provide a data processing method and apparatus capable of reducing a load to the apparatus resulting from recognizing kinds of gestures, and to enable inputting many kinds of commands.

2. Brief Summary of the Invention

A data processing method and apparatus employs means for recognizing gestures by detection of halts of a stylus, and based on the result of the detection, numbers are counted such that the number of touches of the stylus, the number of halts after touch of the stylus, the number of halts after moving of the stylus, and the number of moving the stylus. Consequently, even in an input area for handwritten characters, gestures, other characters and figures are discriminatively recognized, and in any input areas, effective gestures are defined. As a result, frames characteristic of windows, title bars and buttons provided thereon turn unnecessary.

In accordance further to the present invention, while halts of the stylus is detected, menu items changing with time is displayed to enable selecting an item from the menu without moving the stylus.

BRIEF DESCRIPTION OF THE DRAWINGS

FIG. 3 is a table showing relations between values of variables and gestures.

FIG. 4 is a table showing correspondences between kinds of basic operation using the window manager and gestures.

FIG. 5 is a flow chart of a process of detecting a halt of a stylus according to the second embodiment of the present invention.

FIG. 6 is a time chart showing a displayed menu changing in accordance with time during halts of a stylus.

DETAILED DESCRIPTION OF THE PREFERRED EMBODIMENTS

The present invention is explained in the following embodiments, referring to the attached drawings.

First Embodiment

Figure 1:
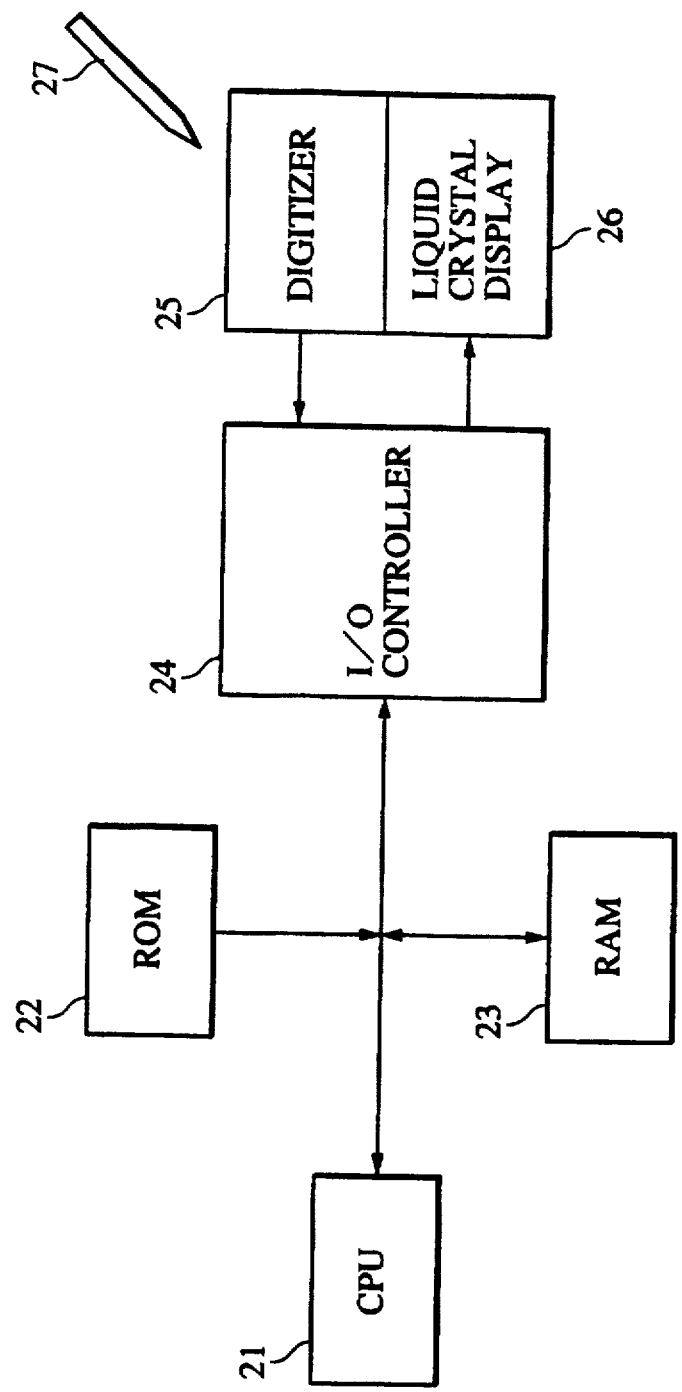
FIG. 1 is a block diagram illustrating the configuration of a data processing apparatus according to embodiments of the present invention.

FIG. 1 is a block diagram illustrating the configuration of a data processing apparatus according to an embodiment of the present invention. The data processing apparatus comprises a central processing unit (CPU) 21 to control the whole apparatus, a read-only memory (ROM) 22 in which a program or the like processed by the CPU 21 is stored, a random access memory (RAM) 23 in which data or the like being operated by the CPU 21 is stored, and an input operation panel to be operated with an input stylus 27. The input operation panel comprises a digitizer 25 to detect a position at which the stylus 27 touches, a liquid crystal display 26, and an input-output (I/O) controller 24 to function as the interface between both input and output of data, and input of operation.

Control programs and various parameters may be stored in advance in the ROM 22 so that they can enable the CPU 21 to execute respective steps including steps shown by a flow chart as explained in this embodiment. On the other hand, programs and various parameters may be stored in the RAM 23 for use by loading of the programs and parameters stored in a storage medium which is removally mounted on the apparatus, such as a floppy disk, or a CD-Rom, while by using communication means as not shown, another apparatus-stored control programs or various parameters may be received via a public data network to be stored in the RAM 23.

Such parameters are operation names and kinds of operation corresponding to various gestures as later mentioned and shown in FIG. 4, thresholds as references to respective determination of Steps 3, 4, 7–9, and 12–14 as shown in a flow chart of FIG. 2, and so forth.

Figure 2:
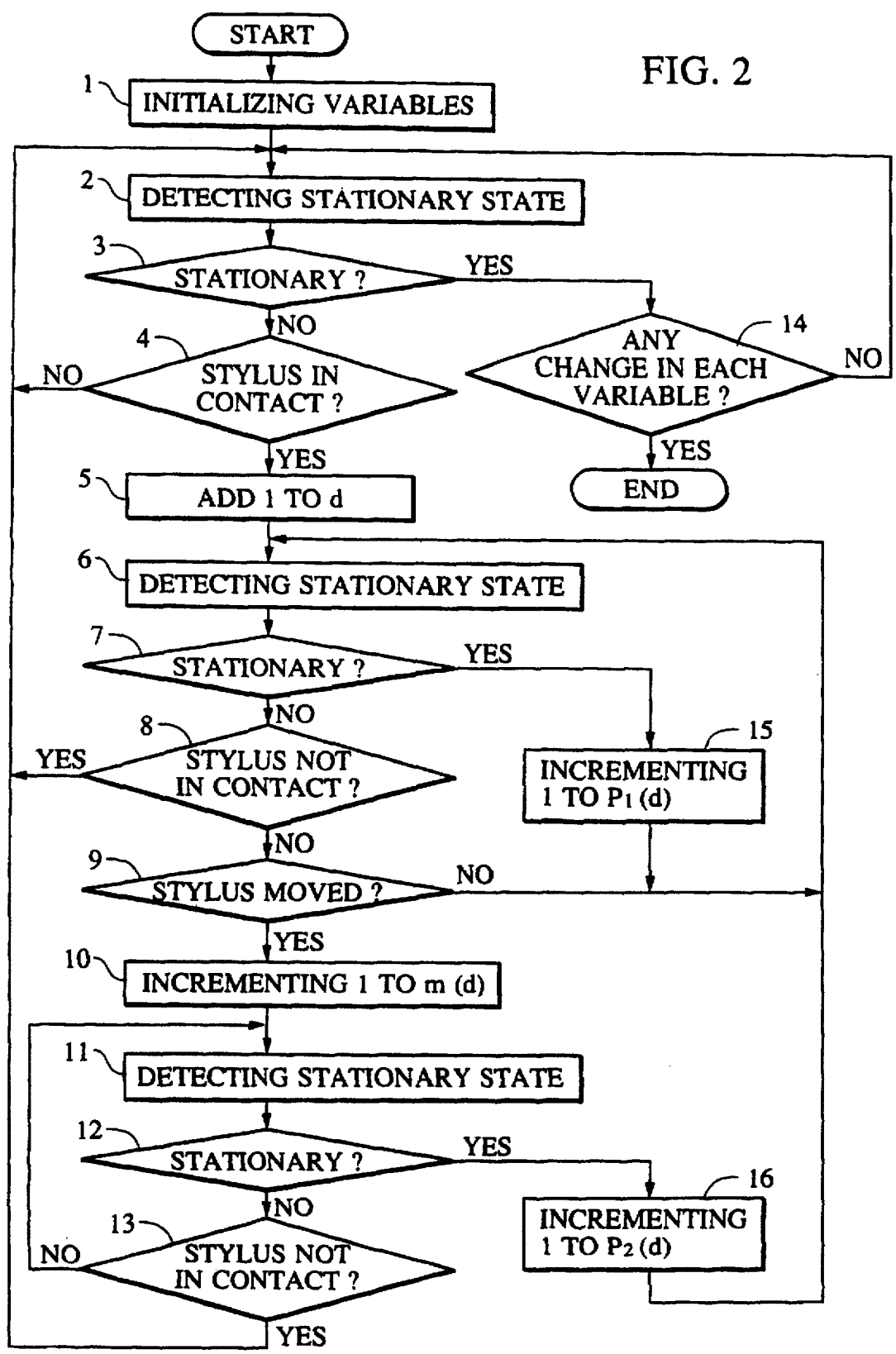
FIG. 2 is a flow chart of a process of recognizing a gesture according to the first embodiment of the present invention.

FIG. 2 is a flow chart of the process of recognizing a gesture, which is executed by the CPU 21.

In Step 1, variables are initialized, where the variables are: the number of touches of the stylus, d; the number of moving the stylus, m(d); the number of halts after touch of the stylus, $P_1(d)$; the number of halts after moving of the stylus $P_2(d)$; and so forth. For details, these variables are all initialized to zeros. The variables, m, $P_1$, and $P_2$ are array variables each having d as an index. The upper limit of the number of touches, d is predetermined in accordance with a kind of gesture.

In Step 2, a halt of the stylus 27 is detected. When the stylus 27 does not touch the digitizer 25, no signal is sent from the I/O controller 24 to the CPU 21, thus the CPU 21 measures time until any signal is sent, and determines such condition as a halt of the stylus. In Step 3, determined is whether the stylus 27 is in a halt or not. If the stylus 27 is in a halt, the process proceeds to Step 14. If not, the process proceeds to Step 4. In Step 14, determined is whether any change is found in each of the variables, d, m, $P_1$, and $P_2$. If it is found, the process terminates. If not, the process returns to the Step 2.

On the other hand, in Step 4, determined is whether the stylus 27 touches the digitizer 25 or not. If the stylus 27 does not touch it, the process returns to the Step 2. If the stylus 27 touches, the process proceeds to Step 5. In the Step 5, 1 is added to the number of touches of the stylus, d. In Step 6, similar to the Step 2, a halt of the stylus 27 is detected. At this time, the stylus 27 is in a halt and touching the digitizer 25, and such condition having continued for certain duration is called PRESS.

In Step 7, determined is whether the PRESS status is on or off. If the PRESS status is on, the process proceeds to Step 15. If not, the process proceeds to Step 8. In the Step 15, incremented by 1 is the number of halts after touch of the stylus, $P_1(d)$, before returning to the Step 6. Further in Step 8, determined is whether the stylus 27 is off from the digitizer 25 or not. If the stylus 27 is off, the process returns to the Step 2. If not, Step 9 is executed.

In the Step 9, determined is whether the stylus 27 has been moved or not. If the stylus 27 has been moved, the process proceeds to Step 10. If not, the process returns to the Step 6. Whether the stylus 27 has been moved is determined in the Step 9 such that by comparing coordinates of the position where the stylus 27 touches the digitizer as detected in the Step 4, with the present coordinates, if any change is found in the coordinates, the change is considered as the stylus 27 has been moved. The determination of moving of the stylus in the Step 9 and the detection of the halts of the stylus in the Steps 9 and 12 are detailed such that after the stylus 27 is detected as in touch as mentioned in the Step 4, coordinate values are stored in a current coordinate value store area of the RAM 23 in which current coordinate values are successively stored, and the stored coordinate values are compared with the current coordinate values, so that resulting change not more than thresholds predetermined as parameters is considered to represent a halt of the stylus as PRESS, while change not less than the threshold is considered to represent moving as DRAG, and with such consideration, the coordinate values stored in the value store area of the RAM 23 are updated to current coordinates to be used in subsequent comparing.

Further, the detection of halts of the stylus as mentioned in the Steps 7 and 12, and the determination of moving of the stylus as mentioned in the Step 9 include determination of whether operation for moving the stylus is completed, or whether operation for halting the stylus is completed, in addition to the above-described determination of moving of the stylus, and detection of halts of the stylus.

The determination of whether operation for moving the stylus is completed is enabled by comparing the current coordinate values with the values stored in the current coordinate value store area of the RAM 23, and subsequently detecting no change in values having been changing or that the stylus 27 is off from the digitizer 25. Likewise, the determination of whether operation for halting the stylus is completed is enabled by comparing the current coordinates values with the values stored in the current coordinate value store area of the RAM 23, and subsequently detecting no change in values having been changing or that the stylus is off from the digitizer.

In Step 10, the number of moving the stylus, m(d) is incremented by 1. In Step 11, similar to the Step 7, a halt of the stylus is detected, exactly, a halt after moving of the stylus is detected. In Step 12, determined is whether the stylus is in a halt or not. If the stylus is in a halt, the process proceeds to Step 16. If not, the process proceeds to Step 13. In Step 16, incremented by 1 is the number of halts after moving of the stylus, $P_2(d)$, before returning to the Step 6, where the number of PRESS status after moving the stylus is counted. On the other hand, in Step 13, similar to the Step 8, determined is whether the stylus is off from the digitizer. If the stylus is off, the process returns to the Step 2. If not, the process returns to the Step 11.

When operations in the foregoing steps have been completed, at least one variable changes, thus, various gestures are recognized, based on a set of variables as shown in FIG. 3. In FIG. 3 is shown relations between values of variables and gestures. One touch (as d=1) of the stylus enables six gestures to be recognized. Plural touches of the stylus enable gestures to be recognized, corresponding to combinations of six gestures resulting from one touch of the stylus, thus the number of gestures to be recognized resulting from d touches are expressed as 6d. Actual use of the gestures needs to select gestures which look having some meanings and are easy to remember.

In FIG. 3, TAP is operation for the stylus 27 to touch the digitizer 25 once, PRESS is operation for stylus 27 to touch the digitizer 25 and to halt the stylus 27, which is represented by a black point in the GESTURE column, DRAG is operation to move the stylus 27 keeping it touching the digitizer 25, and another operation is a combination of these kinds of operation. For example, when the number of touches, d, is 1, and other variables are zeros, such a combination is recognized as TAP. When the number of touches, d, and the number of halts after touch of the stylus, $P_1$, are 1, and other variables are zeros, such a combination is recognized as PRESS. When the number of touches, d, and the number of moving the stylus, m, are 1, and other variables are zeros, such a combination is recognized as DRAG. When the number of touches, d, the number of halts after touch of the stylus, $P_1$, the number of moving the stylus, m, and the number of halts after moving of the stylus, $P_2$, are all 1, such a combination is recognized as PRESS-DRAG-PRESS.

In this embodiment, gestures starting with PRESS are defined as executable gestures, and inputs other than the executable gestures are treated as handwritten characters or figures, in other for the gestures and the inputs of handwritten characters or figures to be easily discriminated. In the discrimination, the gestures are recognized earlier than the inputs.

In FIG. 4 are shown correspondences between kinds of basic operation using the window manager and gestures. The correspondences enable instructing the basic operation by using gestures starting with PRESS.

As described above, in this embodiment, gestures are defined and recognized by using combinations of: the number of touches of the stylus, d; the number of halts after moving of the stylus, $P_1$; the number of moving the stylus, m; and the number of halts after moving of the stylus, $P_2$, not by using a patterns of loci drawn by the stylus, thus gestures are recognized in discriminating from other characters or figures, regardless of whether the input area is an area for handwritten characters or an area for free handwriting, so that gestures effective in the whole window system are defined. As a result, frames characteristic of windows, title bars and buttons provided thereon turn unnecessary.

Second Embodiment

A hardware configuration in the second embodiment is the same as that in the first embodiment as shown in FIG. 1.

The second embodiment uses a process as shown in FIG. 5, in place of the Step 6 as in FIG. 2. Other steps of the process are the same as those of the first embodiment.

In FIG. 6 is shown a display screen in accordance with the second embodiment. Continuing the PRESS status for predetermined duration enables the screen to display a menu as shown in FIG. 6, items of which slowly circulates during PRESS time. An item is selected to be executed by moving the stylus 27.

Procedure of this process is described in accordance with FIG. 5. In Step 51, a variable C to measure the PRESS time is initialized to zero. In Step 52, detected is whether the stylus 27 is in a halt or not. If the stylus is in a halt, the process proceeds to Step 53. If not, the process proceeds to Step 56. In Step 53, 1 is added to the variable C. In Step 54, determined is whether the variable C is equal to a maximum value or not. If C is equal, the process proceeds to Step 51. If not, Step 55 is executed. In the Step 55, circulated and displayed are items appearing in accordance with the variable C as shown in FIG. 6. If a value of the variable C is less than a predetermined value, processing continues without displaying any items. Completing Step 55 leads to returning to the Step 52. In Step 56, the stylus is in status that it has been moved or off, accordingly at the time, an item appearing on the top of the menu is regarded as selected, so that a command for operation corresponding to the item is executed before termination of processing.

According to the second embodiment as described above, the present invention is provided such that the display items of the menu are displayed in being circulated, thus the item is selected without moving the stylus 27.

Further, although in the above two embodiments, the digitizer 25 is designed to detect moves of the stylus such as TAP, PRESS, and DRAG, such functions of the detection may be provided in the stylus 27 so that a signal is inputted from the I/O controller 24. In this case, on the apparatus side, kinds of operation may be recognized in accordance with the table as shown in FIG. 4 by using input of moves of the stylus from the stylus 27, while on the stylus side, kinds of operation may be recognized before data for operation is sent to the apparatus.

According to the above gesture input method in the data processing method of the present invention, recognition of the simple moving of the stylus enables selecting a kind of operation, thus a simple circuit or the like is enough for the recognition. Therefore, the gesture input method can be realized by using a small size stylus.

We claim:

1. A data processing apparatus having a stylus and means for detecting a position at which said stylus touches, to which commands for operation are capable of being inputted by using gestures, said data processing apparatus comprising:

halt detection means for detecting halts of said stylus;

touch counter means for counting the number of touches of said stylus;

first halt counter means for counting the number of halts after touch of said stylus;

second halt counter means for counting the number of halts after moving of said stylus;

move counter means for counting the number of moving said stylus; and gesture recognition means for recognizing said gestures, based on said counted number of touches of said stylus, said counted number of halts of said stylus, said counted number of halts after moving of said stylus, and said counted number of moving said stylus.

2. A data processing apparatus according to claim 1, said data processing apparatus further comprising menu display means for displaying a menu which changes with time while halts of said stylus is detected.

3. A data processing apparatus according to claim 2, wherein said menu display means is a liquid crystal display.

4. A data processing apparatus according to claim 1, wherein said touch counter means is a digitizer.

5. A data processing method using a stylus and means for detecting a position at which said stylus touches, to which commands for operation are capable of being inputted by using gestures, said data processing method comprising the steps of:

detecting of halts of said stylus;

counting the number of touches of said stylus;

counting the number of first halts as the number of halts after touch of said stylus;

counting the number of second halts as the number of halts after moving of said stylus; and counting the number of moving said stylus, wherein gestures are recognized, based on the counted number of touches of said stylus, the counted number of halts after touch of said stylus, the counted number of halts after moving of said stylus, and the counted number of moving said stylus.

6. A data processing method according to claim 5, wherein a menu changing with time is displayed during said detecting halts of said stylus.

7. A data processing method according to claim 6, wherein said menu is displayed on a liquid crystal display.

8. A data processing method according to claim 5, wherein a digitizer detects the position at which said stylus touches.

* * * * *

UNITED STATES PATENT AND TRADEMARK OFFICE
CERTIFICATE OF CORRECTION

PATENT NO. : 5,748,926
DATED : May 5, 1998
INVENTOR(S) : RYOJI FUKUDA, et al.

It is certified that error appears in the above-identified patent and that said Letters Patent is hereby corrected as shown below:

COLUMN 3

Line 11, "determined is" should read --it is determined--.

Line 14, "determined is" should read --it is determined--.

Line 18, "determined is" should read --it is determined--.

Line 27, "determined is" should read --it is determined--.

Line 32, "determined is" should read --it is determined--.

Line 35, "determined is" should read --it is determined--.

COLUMN 4

Line 13, "determined is" should read --it is determined--.

Line 20, "determined is" should read --it is determined--.

Signed and Sealed this

Nineteenth Day of January, 1999

Attest:

Attesting Officer

*Acting Commissioner of Patents and Trademarks*